United States Patent [19]

Takahashi et al.

[11] Patent Number: 5,222,922
[45] Date of Patent: Jun. 29, 1993

[54] INSCRIBED MESHING PLANETARY GEAR CONSTRUCTION

[75] Inventors: Atsushi Takahashi; Shigeru Toyosumi, both of Ohbu; Kiyoji Minegishi, Aichi; Takashi Haga, Ohbu, all of Japan

[73] Assignee: Sumitomo Heavy Industries, Ltd., Tokyo, Japan

[21] Appl. No.: 927,916

[22] Filed: Aug. 11, 1992

[30] Foreign Application Priority Data

Aug. 13, 1991 [JP] Japan ................... 3-228340

[51] Int. Cl.⁵ ........................... F16H 1/28
[52] U.S. Cl. ................................ 475/178
[58] Field of Search ............................ 475/178

[56] References Cited

U.S. PATENT DOCUMENTS

| | | | |
|---|---|---|---|
| 1,833,648 | 11/1931 | Johnson | 475/178 X |
| 3,145,585 | 8/1964 | Brown | 475/178 |
| 3,160,032 | 12/1964 | Black | 475/178 X |

*Primary Examiner*—Dirk Wright
*Attorney, Agent, or Firm*—Nikaido Marmelstein Murray & Oram

[57] ABSTRACT

An inscribed meshing speed increasing and reduction gear construction in which external teeth (for example, a1 and a2, b1 and b2, and c1 and c2) cut at the same position during processing are not simultaneously meshed with (outer pins 111 of) internal-tooth gear during operation in order to improve the accuracy after completion of assembling even if the gear is cut by a machine of similar processing accuracy. Thereby, (although it seems to be contrary to a conventional idea that said external teeth cut at the same position should be simultaneously meshed with the internal-tooth gear), the actual accuracy after completion of assembling can be improved. In this case, when both the number of teeth (24 in FIG. 1) of external-tooth gears 105a and 105b, and a difference in the number of teeth (4 in FIG. 4) between the external-tooth gear and (outer pins 111) internal-tooth gear, are set to integer times of the number (2 in FIG. 1) of the external-tooth gears, the external teeth of the external-tooth gears and various holes formed in the external-teeth can be all simultaneously (by one setting) cut, and remarkably improving the accuracy of the positional relationship between the external teeth and various holes.

4 Claims, 7 Drawing Sheets

PRIOR ART

INSCRIBED MESHING PLANETARY GEAR CONSTRUCTION

BACKGROUND OF THE INVENTION

1. Field of the Invention

This invention relates to an inscribed meshing planetary gear construction which is preferably applied to a speed increasing or a reduction gear, more particularly, a small-sized speed increasing gear or a reduction gear in which a high output torque is required.

2. Description of the Prior Art

In the prior art, it is widely known to provide a speed increasing gear or a reduction gear employing an inscribed meshing planetary gear construction comprising a first shaft, an external-tooth gear mounted (assembled) on the first shaft through a eccentric body in a state where the external-tooth gear can be rotated eccentric around the first shaft, an internal-tooth gear with which the external-tooth gear is inscribed and meshed, and a second shaft connected to the external-tooth gear through means for transmitting only the rotation component of the external-tooth gear.

Figure 6:
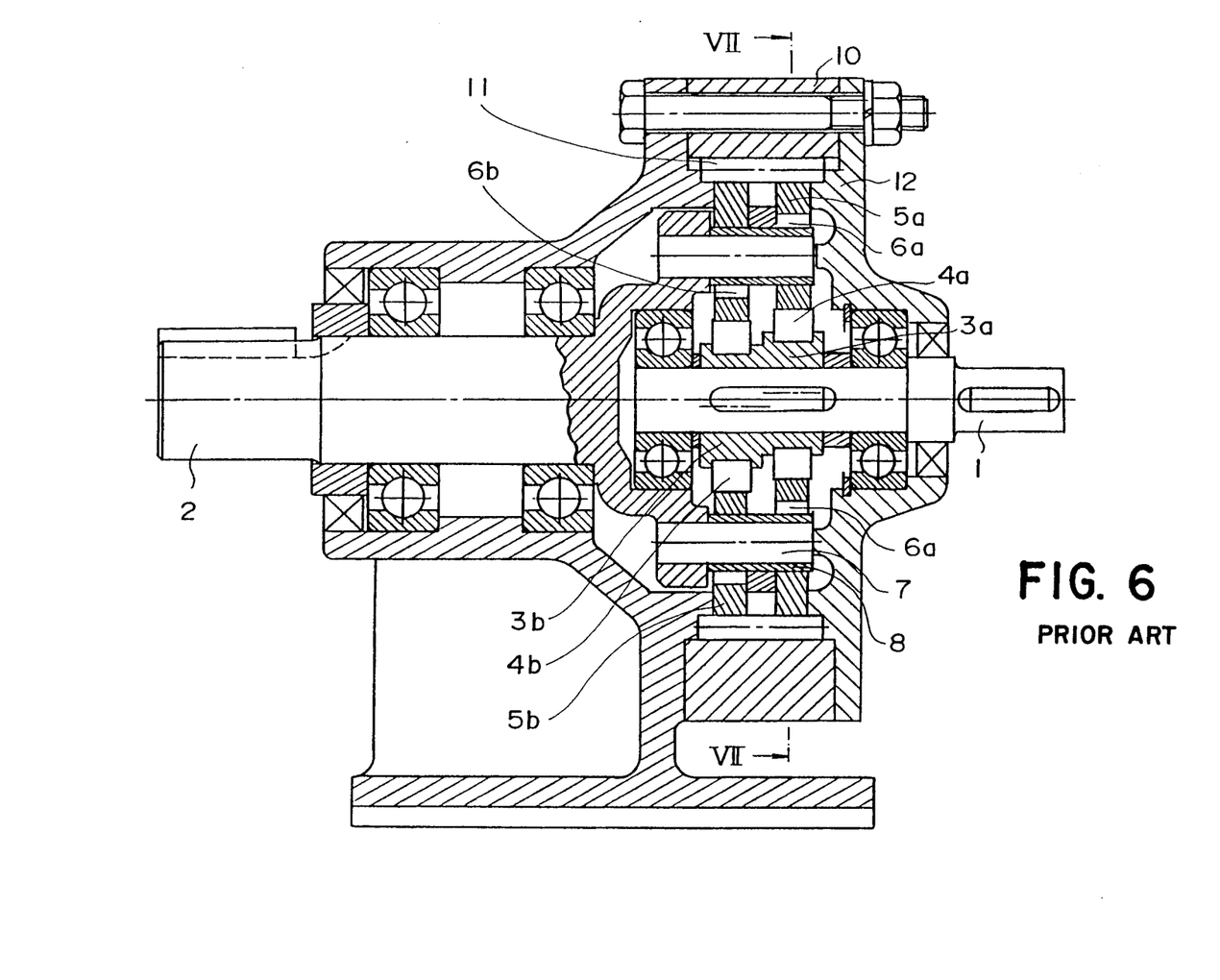
FIG. 6 is a sectional view showing a reduction gear to which is applied a conventional inscribed meshing planetary gear construction.
Figure 7:
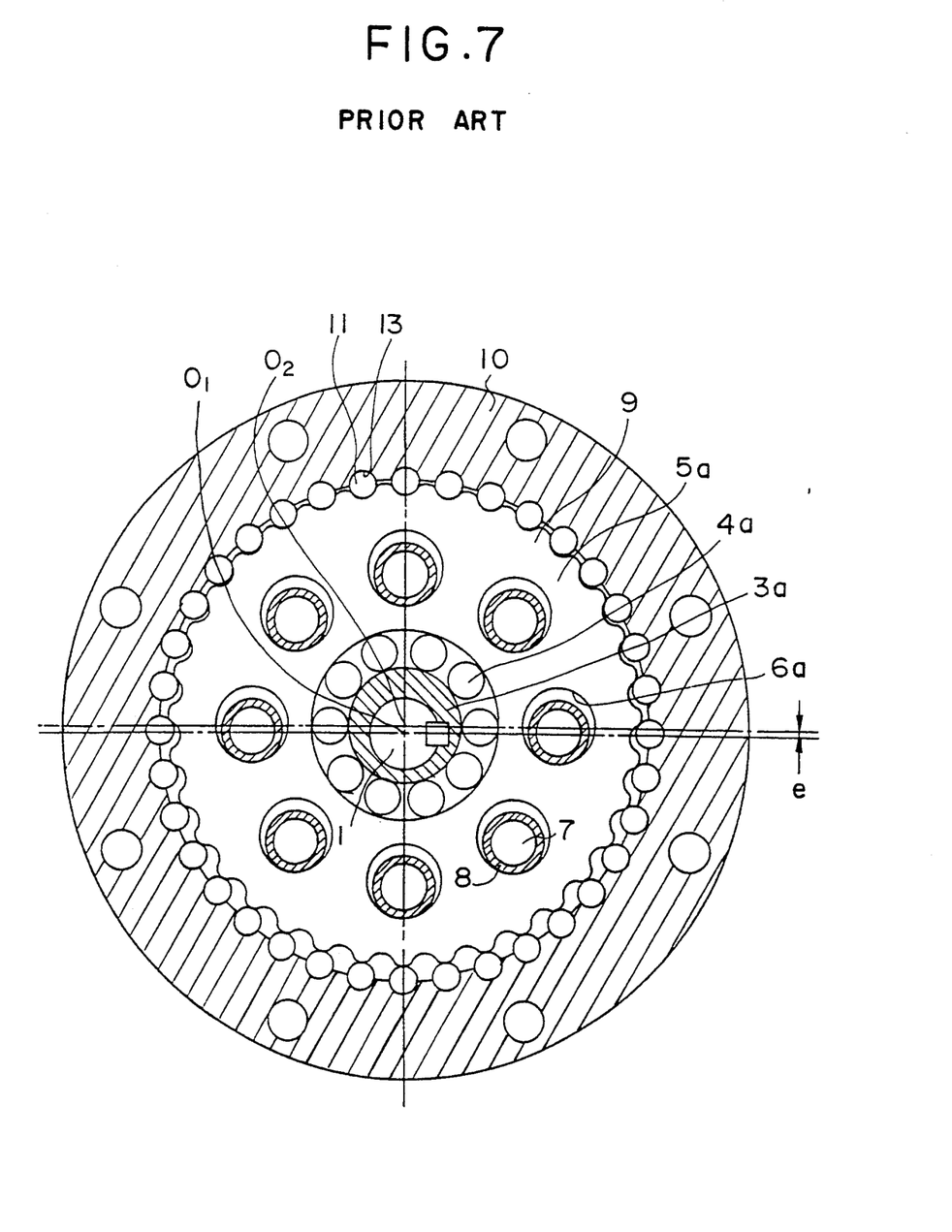
FIG. 7 is a sectional view taken on line VII—VII of FIG. 6.

An example of the prior art of this construction is shown in FIGS. 6 and 7. This prior art is constructed such that said first shaft is applied as an input shaft, said second shaft is applied as an output shaft and at the same time said construction is applied to a reduction gear by fixing the internal-tooth gear.

Eccentric bodies 3a, 3b are mounted on the input shaft 1 with a predetermined phase difference (180° in this example). The eccentric bodies 3a, 3b are integrated into one body. Two external-tooth gears 5a, 5b are placed on to each of these eccentric bodies 3a, 3b through eccentric bearings 4a, 4b. A plurality of inner roller holes 6 are provided in the external-tooth gears 5a, 5b and then an inner pin 7 and an inner roller 8 are fitted in the roller holes.

External teeth 9 such as trochoidal teeth or circular teeth etc. are at outer circumferences of said external-tooth gears 5a, 5b. The outer teeth 9 are inscribed and meshed with the internal-tooth gear 10 fixed to a casing 12. The internal teeth of the internal-tooth gear 10 are constructed such that an outer pin 11 is loosely fitted to an inner pin hole 13 and held to be easily rotatable.

An inner pin 7 passing through said external-tooth gears 5a, 5b is tightly fitted to or fixed to a flange part 14 of the output shaft 2.

When the input shaft 1 is rotated once, the eccentric bodies 3a, 3b in conjunction rotate once. The external-tooth gears 5a, 5b are apt to oscillatebly rotate around an eccentric axis about shaft 1 through this one revolution of the eccentric bodies 3a and 3b. However, since the rotation is restricted by the internal-tooth gear 10, the external-tooth gears 5a, 5b almost perform an eccentric rotation while being inscribed with the internal-tooth gear 10.

Now, it is assumed that the number of teeth of the external-tooth gears 5a, 5b is N and the number of teeth of the internal-tooth gear 10 is N+1, then the difference between the numbers of teeth is 1. Consequently, the external-tooth gears 5a, 5b are displaced by one tooth relative to the internal-tooth gear 10 fixed to the casing 12 every time the input shaft 1 is rotated. This means that one revolution of the input shaft 1 is decelerated to a revolution of $-1/N$ ($-$ sign show change in direction) of the internal-tooth gear.

Oscillation component of the external-tooth gears 5a, 5b is absorbed by clearances between the inner roller holes 6 and the inner pins 7 and then only the revolution component is transmitted to the output shaft 2 through the inner pins 7.

In this case, the inner roller holes 6a, 6b and the inner pins 7 (inner rollers 8) form an "isokinetic inscribed meshing mechanism".

As a result, finally, a reduction of reduction ratio $-1/N$ can be accomplished.

In the example of this prior art, the internal-tooth gear of the inscribed meshing planetary gear construction is fixed, the first shaft is an input shaft and the second shaft is an output shaft. However, a reduction gear can be also constructed by fixing the second shaft and applying the first shaft as an input shaft and the internal-tooth gear as an output shaft. Furthermore, a speed increasing gear can also be constructed by reversing these inputs and outputs.

By the way, in the above-described prior art, two external-tooth gears are provided mainly because of consideration of increase in transmission capacity, increase of strength or maintenance of rotational dynamic balance. Generally, external teeth of these two external-tooth gears are simultaneously cut (manufactured or processed) in a condition where they are superimposed in order to reduce the number of steps of manufacturing. In this case, these two external-tooth gears are assembled so that the external tooth of one of the external-tooth gears and the external tooth of the other external-tooth gear(s), which had been cut at same position during manufacturing respectively, are simultaneously meshed with the internal-tooth gear during operation in order to cancel manufacturing errors with each other.

For example, in case of "two" external-tooth gears, phases in the maximum eccentric direction are deviated by 180° from each other. Therefore, the two external-tooth gears are rotated by 180° and assembled so that said external teeth cut at the same position are simultaneously meshed with the internal-tooth gear during operation. Under an idea similar to the above, in case of "three" external-tooth gears, since the respective maximum eccentric directions are rotated by 120° from one another, the external-tooth gears are rotated by 120° and assembled so that said external teeth cut at the same position are simultaneously meshed with the internal-tooth gear during operation.

This is because of the idea that said external teeth cut at the same position are simultaneously meshed with the internal-tooth gear whereby manufacturing errors are cancelled from each other.

Recently, also in the field of the speed increasing and reduction gear employing the inscribed meshing planetary gear construction of this kind, miniaturization and higher accuracy have been strongly demanded.

Actually, to respond to such a demand by improving the working accuracy is one aspect and the limitation of cost has to be considered.

SUMMARY OF THE INVENTION

Under these circumstances, in addition to improve the quality by merely improving the working accuracy, the present inventors more basically review the aforementioned construction and have developed a new construction under an attempt of obtaining an increasing and reduction gear of higher quality by using a new process of cutting using the same cutting machine.

According to the present invention, there is provided an inscribed meshing planetary gear construction comprising a first shaft, a even number of external-tooth gears mounted so that the gears can be rotated eccentric around the first shaft through an eccentric body mounted on the first shaft, internal-tooth gear with which the external-tooth gears are inscribed and meshed, and a second shaft connected to said external-tooth gears through means for transmitting only the rotation component of the external-tooth gears, characterized in that the number of teeth of each of the external-tooth gears is set to integer times of the number of the external-tooth gears, a difference of the number of teeth between the internal-tooth gear and the external-tooth gear is set to integer times of the number of the external-tooth gears, the plurality of external-tooth gears being simultaneously cutted in a state where they are superimposed, and the external-tooth gears are assembled in such a manner that they are moved in parallel in the maximum eccentric direction so that the external tooth of one of the external-tooth gears and the external tooth of the other external-tooth gear(s), which had been cut at same position during manufacturing respectively, are not simultaneously meshed with the internal-tooth gear during operation.

According to the present invention, there is further provided an arrangement wherein the number of the external-tooth gears is set to 2, a difference in the number of teeth between the internal-tooth gear and the external-tooth gear is set to 2, and the two external-tooth gears are assembled to be apart from each other without rotating thereof as they are in the maximum eccentric direction whereby the external tooth of one of the external-tooth gears and the external tooth of the other external-tooth gear(s), which has been cut at same position during manufacturing respectively, are not simultaneously meshed with the internal-tooth gear during operation.

According to the present invention, there is still further provided an inscribed meshing planetary gear construction comprising an original shaft connected to an external member, a plurality of first shafts which rotate in response to the rotation of the original shaft, a two or more of external-tooth gears mounted in a state where they can be rotated eccentric around the original shaft through eccentric bodies provided on the plurality of first shafts, internal-tooth gear inscribed and meshed with the external-tooth gears, and a second shaft connected to the external-tooth gears through means for transmitting only the rotation component of the external-tooth gears, characterized in that the number of teeth of each of the external-tooth gears is set to integer times of the number of the external-tooth gears, a difference of the number of teeth between the internal-tooth gear and the external-tooth gears is set to integer times of the number of the external-tooth gears, the plurality of external-tooth gears being simultaneously cut in a state where they are superimposed, and the external-tooth gears are assembled in such a manner that they are moved in parallel in the maximum eccentric direction so that the external tooth of one of the external-tooth gears and the external tooth of the other external-tooth gear(s), which had been cut at same position during manufacturing respectively, are not simultaneously meshed with the internal-tooth gear during operation.

According to the present invention, there is further provided an arrangement wherein the number of said first shafts is set to 3, the number of said external-tooth gears is set to 2 and a difference of teeth between said internal-tooth gear end and the external-tooth gear is set to 2, the two external-tooth gears being assembled to be apart from each other without rotating thereof as they are in the maximum eccentric direction whereby the external tooth of one of the external-tooth gears and the external tooth of the other external-tooth gear(s), which had been cut at same position during manufacturing respectively, are not simultaneously meshed with the internal-tooth gear during operation.

The present invention was developed by carefully reviewing parts or portions which have been considered to be common sense and to which no attention has paid.

That is, it has been heretofore believed that in the case where a plurality of external-tooth gears are provided, manufacturing errors are cancelled from each other by "simultaneously meshing said external teeth cut at the same position with internal-tooth gear during operation". Namely, the external tooth of one of the external-tooth gears and the external tooth of the other external-tooth gear(s), which had been cut at same position during manufacturing respectively, should be simultaneously meshed with the internal-tooth gear during operation in order to cancel manufacturing errors with each other. The speed increasing and reduction gear of this type which has been actually heretofore produced has been produced on the basis of the aforesaid idea.

It has been found however that according to actual reviewing and confirmation by the inventors, good results cannot be obtained by simultaneously meshing said external teeth cut at the same position with the internal-tooth gears.

The present invention has been achieved on the basis of the aforementioned knowledge. One of important materials of the present invention lies in that "said external teeth cut at the same position are not simultaneously meshed with the internal-tooth gears during operation". It has been confirmed from the test results made by the inventors that a manufacturing error is rather cancelled by the aforementioned material.

On the other hand, the present inventors have studied how concretely "said external teeth cut at the same position are not simultaneously meshed", and after all found that the most rational assembly structure is attained by an arrangement wherein the number of teeth of the external-tooth gears is set to integer times of the number of the external-tooth gears, and a difference in teeth between the internal-tooth gear and the external-tooth gear is set to integer times of the number of the external-tooth gears.

That is, generally, when there are two external-tooth gears, as mentioned above, the phase of the maximum eccentric directions of both the external-tooth gears are deviated by $360°/2 = 180°$, and in the case of three external-tooth gears, the phase of the maximum eccentric direction of each external-tooth gear is deviated by $360°/3 = 120°$. This is because of the fact that the maximum eccentric direction of each external-tooth gear is diffused circumferentially and equally whereby the dynamic balance of the speed increasing and reduction gear can be well maintained.

According to the present invention, the number of teeth of the external-tooth gear is set to integer times of the number of the external-tooth gears, and a difference of teeth between the internal-tooth gear and the external-tooth gear is set to integer times of the number of the external-tooth gears. In this manner, said external-tooth gears cut at the same position can be assembled merely by moving (rotating) them in parallel in the maximum eccentric direction (instead of rotating them as in prior art).

For example, in the case where the number of the external-tooth gears is two, they can be assembled by merely moving apart from each other (without rotation) in a direction of 180°, and in the case of three, the external-tooth gears can be assembled by merely moving the external-tooth gears respectively in parallel (without rotation) in a direction of 120°.

This assembly based on the method of parallel movement is advantageous in that a plurality of external-tooth gears can be completely simultaneously cut (processed or manufactured).

That is, in the inscribed meshing planetary gear construction of this kind, it was often that a difference in the number of teeth between the internal-tooth gear and the external-tooth gear is set to 1 irrespective of the number of external-tooth gears in the prior art. However, when the difference in the number of teeth is set to 1, the positional relationship between the maximum eccentric direction of the external-tooth gear and the external teeth becomes different every external-tooth gear. Therefore, in the external-tooth gears, it has been substantially impossible to simultaneously cut the external teeth and holes through which input and output shafts extend. That is, it has been necessary that after only the external teeth of external-tooth gears have been cut simultaneously, the phases of the external-tooth gears are rotated by a predetermined amount (a half-tooth portion), then the input and output shaft holes are cut. This causes not only an increase of the steps of processing but also a extreme lowering of processing accuracy.

The present invention takes this into consideration, and the relationship between the number of the external-tooth gears, the number of teeth of the external-tooth gear and the difference in the number of teeth between the internal-tooth gear and the external-tooth gear is specified. Therefore, by merely positioning all the external-tooth gears once, all the external teeth and input and output shaft holes can be simultaneously processed. As the result, the accuracy can be remarkably improved.

In the past, those skilled in the art have a basic idea of "said external teeth cut at the same position should be simultaneously meshed with the internal-tooth gears". It has been therefore considered that when the number of external-tooth gears is set to F, each external-tooth gear need be assembled after it is rotated through 360° /F. corresponding to a phase difference in the maximum eccentric direction, and so has been done actually.

On the other hand, the relationship between said numbers has been on the premise that the external-tooth gears are assembled by parallel movement thereof without rotation. This relationship has not been totally considered in the prior art.

By the way, since the present invention is on the premise that when a plurality of external-tooth gears are assembled, the external-tooth gears are moved in parallel (without rotation), as a consequence of which extremely excellent results are obtained when this is applied to an inscribed meshing planetary gear construction (for example, U.S. Pat. No. 3,129,611) of the type in which a first shaft (an input shaft in case of a reduction gear) is divided into multi sections.

That is, in the inscribed meshing planetary gear construction of this type, generally, three (odd) input shafts, or a so-called uneven arranged input shafts which is not at equal intervals on the circumference has been often employed. Accordingly, in the case of the external-tooth gear having holes corresponding to odd or uneven input shafts as described above, as far as it is based on an idea in which said external teeth simultaneously cut at the same position are simultaneously meshed, it was inevitably impossible to simultaneously cut all the external teeth of the external-tooth gears and holes for the input and output shafts. That is, after the external teeth have been simultaneously cut once, it has been necessary to cut the holes for the input and output shafts after the phases of the external-tooth gears have been rotated. Because of this, it is extremely difficult to position and cut them while accurately corresponding the external teeth of the external-tooth gears to the holes for the input and output shafts. Actually, the high accuracy assembly cannot be performed.

However, as described above, by employing an arrangement on the premise of an idea in which said external teeth cut at the same position are assembled so as not to be meshed simultaneously, and by adequately specifying the number of the external-tooth gears, the number of external teeth and the difference in the number of teeth between the external and internal-tooth gears, these external-tooth gears can be assembled by moving them in parallel in a lateral or obliquely lateral direction. Therefore, even if whatever input shaft holes or output shaft holes are provided on the external-tooth gears, the external-tooth gears are superimposed, and then, the external teeth and all holes for the input and output shafts etc. can be simultaneously cut.

As the result, even if cutting is carried out using a cutting machine similar to that of prior art, the accuracy after completion of assembly can be remarkably improved.

As described above, according to the present invention, it is possible to realize a decrease of a manufacturing error (though it seems to be contrary to conventional common sense at a glance) to improve the accuracy after completion of assembly since said external teeth cut at the same position are not simultaneously meshed with the internal-tooth gears.

In connection with the above, in the present invention, since the number of external-tooth gears, the number of teeth of the external-tooth gear, and the difference in the number of teeth between the external-tooth gear and the internal-tooth gear are adequately specified, the external-tooth gear can be assembled by moving it in parallel (instead of rotation), and as a result, in the case where what shape of holes are present at what position on the external-tooth gear, the whole external-tooth gear including external teeth and various holes can be cut (processed) by one setting. As the result, the accuracy of the positional relationship between the external teeth and various holes can be remarkably enhanced, and even if they are cut by a machine tool of similar level, the accuracy after completion of assembly can be greatly improved.

BRIEF DESCRIPTION OF THE DRAWINGS

The above and other objects, features and advantages of the present invention will become more apparent from the following description of the invention taken in conjunction with the accompanying drawings, wherein like reference characters designates the same or similar parts, and wherein.

DETAILED DESCRIPTION OF THE PREFERRED EMBODIMENTS

Before describing the concrete embodiments of the present invention, the principle of the present invention will be described by way of the simplest example.

Figure 1:
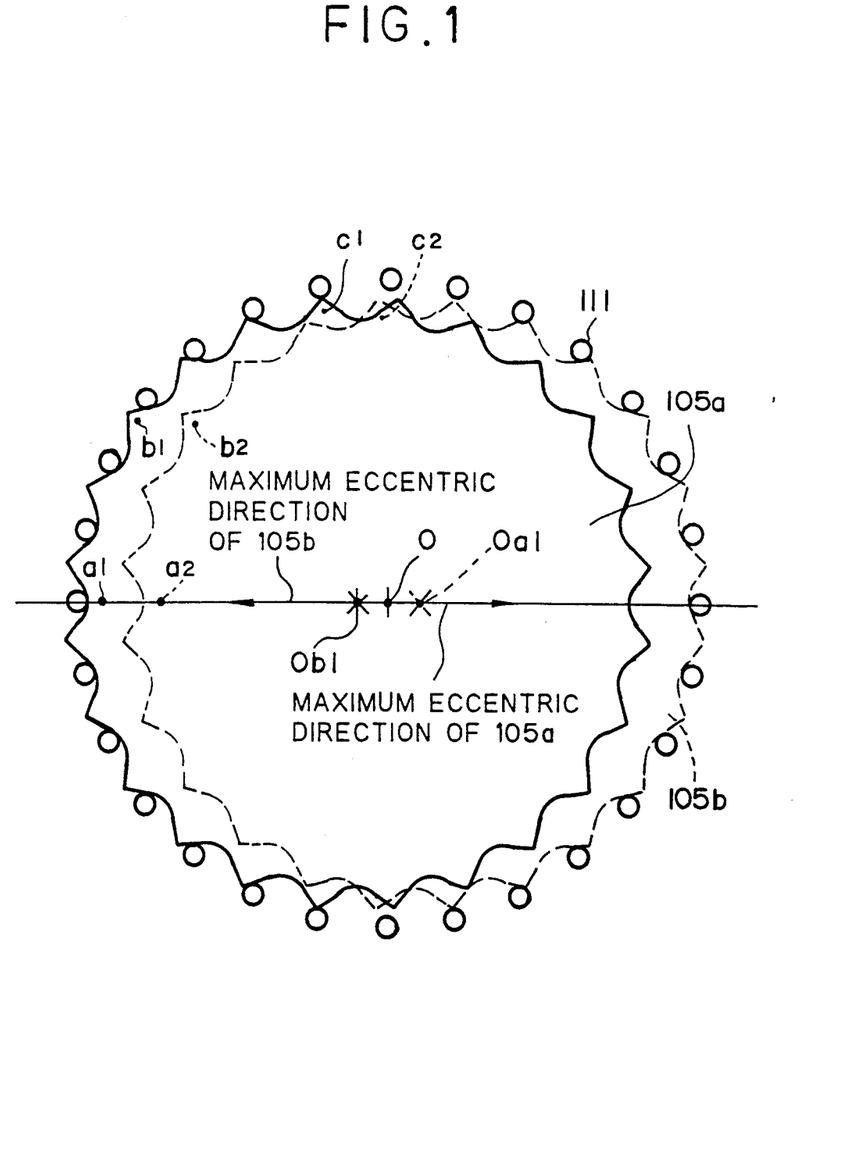
FIG. 1 is a view for explaining the principle of the present invention by way of the simplest example.

FIG. 1 shows the relationship between two external-tooth gears 105a, 105b and an outer pin 111 corresponding to internal teeth of an internal-tooth gear 110.

As will be apparent from FIG. 1, the external-tooth gears 105a and 105b have the number of teeth set to "24" which are integer times of the number "2" of the external-tooth gears 105a and 105b. The number of the outer pins is "28". Accordingly, a difference in the number of teeth between the external-tooth gears 105a and 105b and the outer pins 111 is set to "4" which is integer times of the number "2" of the external-tooth gears 105a and 105b.

The reference numeral 0 denotes the center of an input shaft, 0a1 denotes the center of an eccentric body on the external-tooth gear 105a side, and 0b1 denotes the center of an eccentric body on the external-tooth gear 105b side.

As the result of this setting, when the external-tooth gears are assembled, it is sufficient for then be moved in parallel in the maximum eccentric direction (in this case, apart by 180°), and even if what shape of input and output shaft holes or inner pin holes are formed at what position on the external-tooth gears 105a and 105b, the external teeth of both the external-tooth gears and various holes can be cut at one time (by one setting).

Moreover, since the gears are assembled in a state where they are moved in parallel, said external teeth cut at the same position (for example, a1 and a2, b1 and b2, or c1 and c2, in the figure) are not inevitably simultaneously meshed with the internal-tooth gears. Thus, the basic idea "the external teeth which had been cut at the same position during processing are not simultaneously meshed with the internal-tooth gears" which comprises one of important elements of the present invention can be realized.

The establishment of the relationship between the number of the external-tooth gears, the number of teeth and the difference in the number of teeth corresponds to the essential requirement for enabling assembling without fail by "parallel movement". When the aforementioned relationship is established, the gears can be mounted without fail by "parallel movement". However, when the aforementioned relationship is not established, the gears cannot be always assembled by "parallel movement".

The fact that the gears can be assembled by "parallel movement", that is, the fact that the external-tooth gears can be assembled without rotation, corresponds to the essential requirement for enabling processing the external teeth of the external-tooth gears and various holes at one time even if what shape of holes are formed at what position on the external-tooth gears. In the cases where the gears can be assembled by parallel movement, it is possible to cut by one setting the external teeth of the whole external-tooth gear and various holes without fail. However, when the gears cannot be assembled by parallel movement, that is, when the assembling cannot done unless either of external-tooth gears is rotated with respect to the other external-tooth gear (after cutting), it is not always possible to cut at one time the external teeth of the whole external-tooth gears and various holes.

Figure 2:
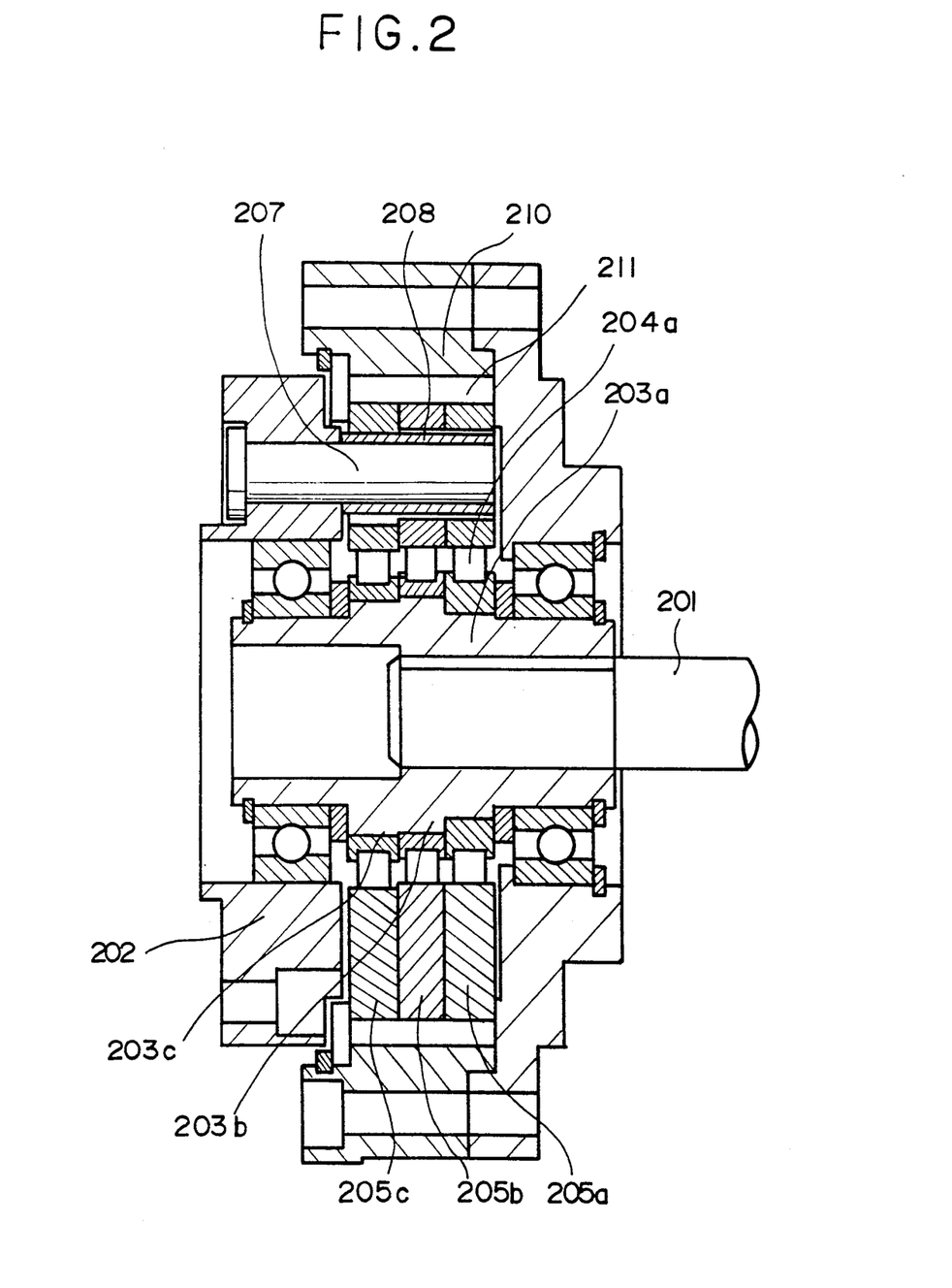
FIG. 2 is a sectional view showing a reduction gear of the type which has three external-tooth gears according to an embodiment of the present invention.

The concrete example of the present invention will be described hereinbelow with reference to FIGS. 2 and 3. In this embodiment, the number of the external-tooth gears is set to "3". The number of teeth of the external-tooth gears 205a to 205c is set to "33" which is integer times of the number "3" of the external-tooth gear. Further, the number of outer pins 211 (corresponding to the number of teeth of the internal-tooth gear) is set to "36", and a difference in the number of teeth between it and the external teeth of the external-tooth gear is set to "3". That is, the difference in the number of teeth is set integer times of the number "3" of the external-tooth gear.

As a result, when the external-tooth gears 205a to 205c are assembled, it is sufficient for them to be moved in parallel in a direction of 120° which is the maximum eccentric direction. Therefore, said external teeth cut at the same position are not inevitably simultaneously meshed with the outer pins 211 to enable realization of the idea of the present invention.

Figure 3:
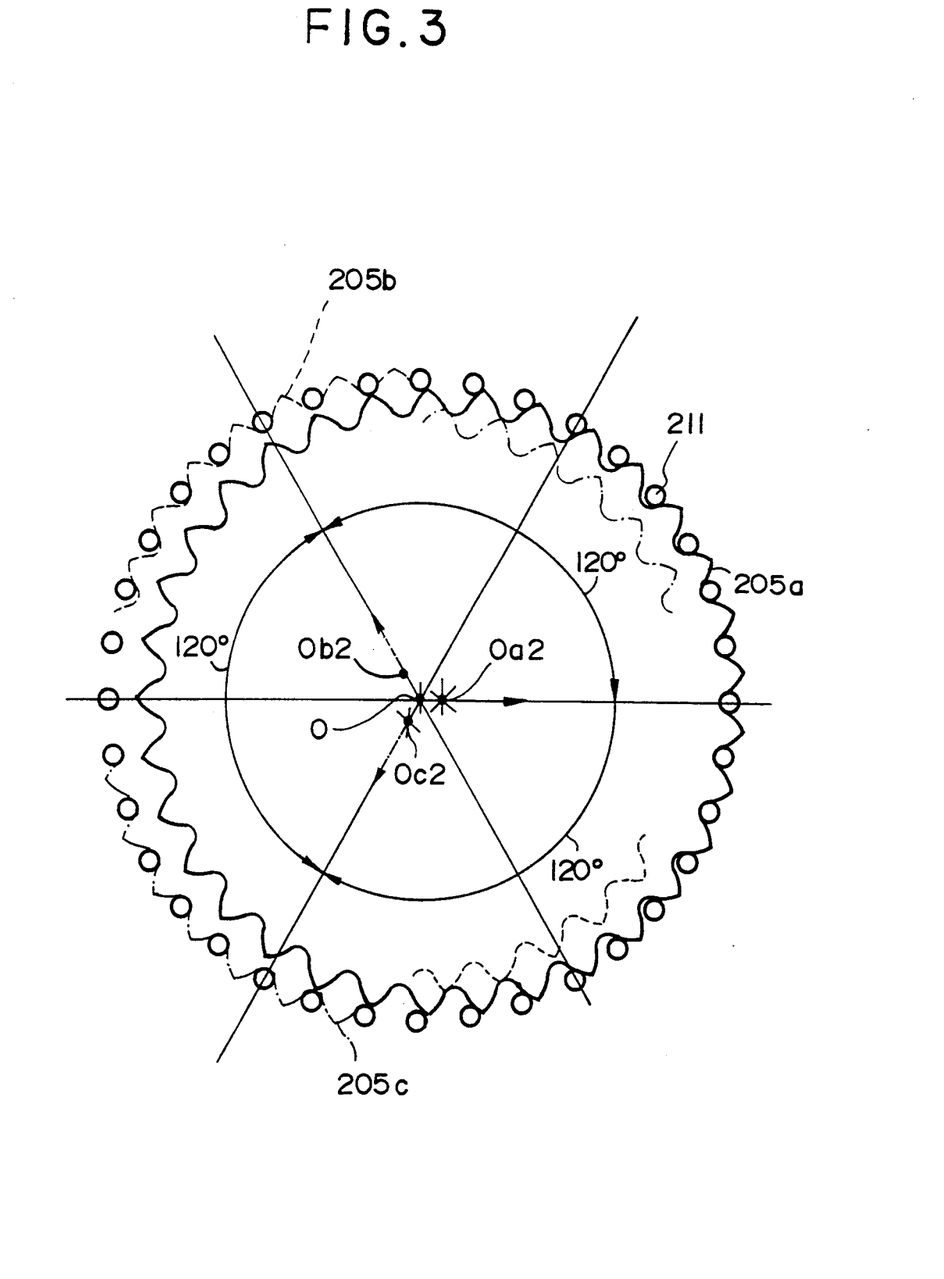
FIG. 3 is a view showing the relationship between the external-tooth gear and an outer pin according to the aforementioned embodiment.

Although description of inner pin holes and holes for input and output shafts is omitted in FIG. 3, even if what shape of holes are formed at what position, first, the external-tooth gears 205a to 205c are superimposed, and under such condition, the external teeth and various holes can be cut at one time. This is the effect which can be first realized by the method for mounting the external-tooth gears by parallel movement in accordance with the idea of the present invention, and the effect that cannot be realized by the idea in which the external-tooth gears are rotated until they coincide with the maximum eccentric direction and assembled in order that said external teeth cut at the same position are simultaneously meshed with the internal-tooth gear, as in the prior art.

In the figure, numerals 0a2, 0b2 and 0c2 denote the centers of the eccentric bodies 202a to 203c, respectively. Other structures are basically the same as those of previously mentioned prior art, and reference numerals which are the same in later two figures as the former are attached to the same or similar parts in the figures and a duplicate description will be omitted.

Figure 4:
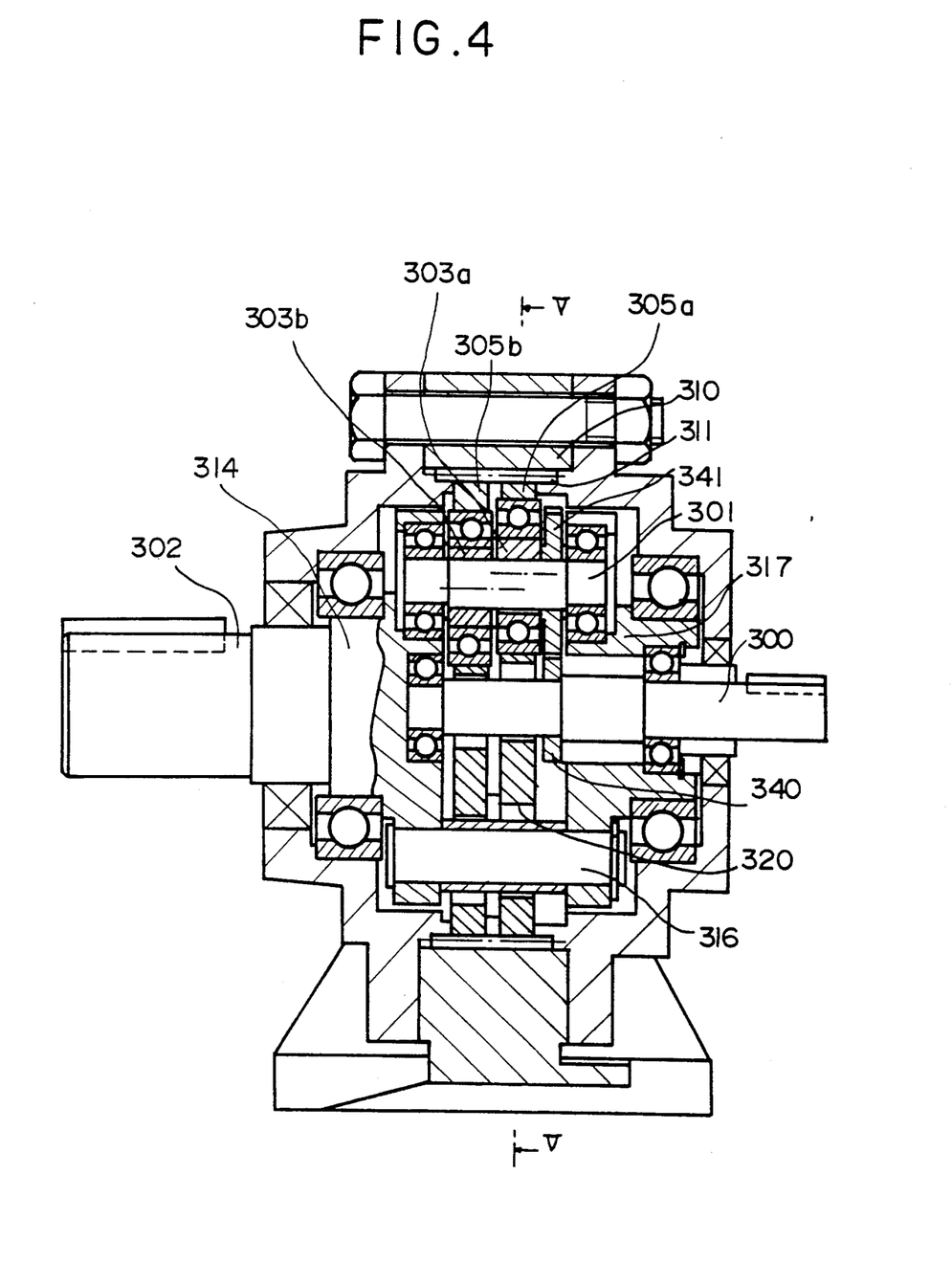
FIG. 4 is a sectional view showing a reduction gear of the type in which an input shaft is divided into three sections and which has two external-tooth gears, according to a further embodiment of the present invention.
Figure 5:
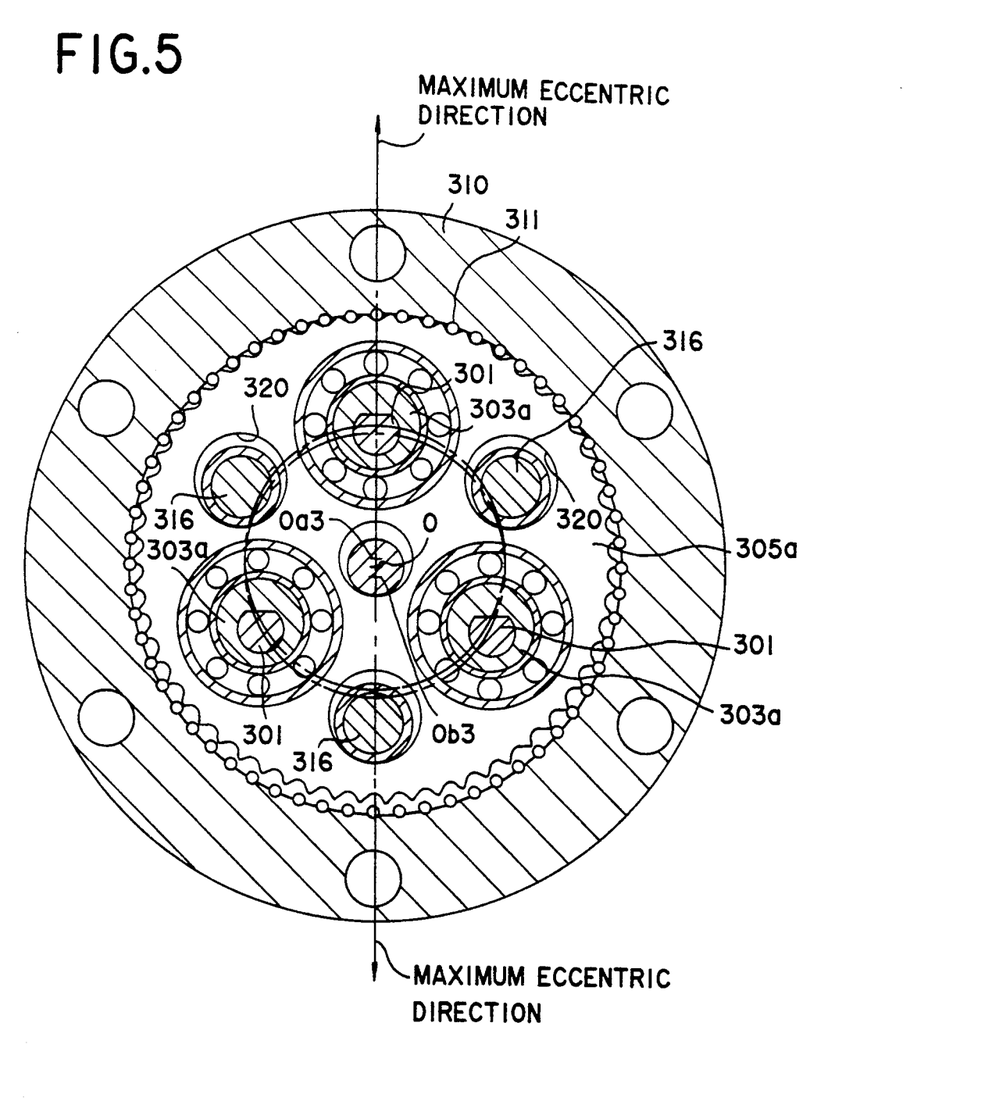
FIG. 5 is a sectional view taken on line V—V of FIG. 4.

FIGS. 4 and 5 shows an example in which the present invention is applied to an inscribed meshing planetary gear construction of the type in which an input shaft is divided into three sections.

This construction comprises an original shaft 300 connected to an external member (motor) not shown, three input shafts 301 rotated in response to the rotation of the original shaft 300, two external-tooth gears 305a and 305b mounted (assembled) rotates on an eccentric axis about the original shaft 300 through eccentric bodies 303a and 303b provided on the three input shafts 301, an internal-tooth gear 310 with which the external-tooth gears 305a and 305b are inscribed and meshed, and an output shaft 302 connected to the external-tooth gears 305a to 305b through means (later described) for transmitting only the rotation component of the external-tooth gears 305a and 305b.

This embodiment will be described in further detail. When the original shaft 300 rotates, the three input shafts 301 rotate at the same speed in the same direction through the (one) gear 340 and (three) gears 341 in response to the rotation of the original shaft 300. The (three) eccentric bodies 303a and (three) 303b are fitted into these three input shafts 301, and the eccentric bodies 303a and 303b are eccentrically rotated at the same speed in the same direction whereby two external-tooth gears 305a and 305b are rotated eccentric around the original shaft 300. Two external-tooth gears 305a and 305b are rotated in the maximum eccentric direction by 180° each other.

Three input shafts 301 also serve as the function of conventional inner pins, and transmit only the rotation component of the external-tooth gears 305a and 305b to a flange portion 304 of the output shaft 302 and a support ring 317. The turning force transmitted to the support ring 317 side is transmitted to the flange portion 314 of the output shaft 302 by three carrier pins 316. The external-tooth gears 305a and 305b are formed with carrier pin holes 320 to prevent the oscillation of the external-tooth gears 305a and 305b from interfering the carrier pins 316. Since other structures are the same as those of the above-described prior art, reference numerals which are the same in later two figures are attached to the same or similar parts in the figures and a duplicate description is omitted.

Here, the number of teeth of the external-tooth gears 305a and 305b is set to "58" which is integer times of the number "2" of the external-tooth gears, and the number of outer pins (corresponding to internal teeth of the internal-tooth gear 310) 311 is set to "60". As will be apparent therefrom, a difference in the number of teeth between the external-tooth gear and the outer pins (internal teeth) is "2" which is integer times of the number "2" of the external-tooth gear.

Since this relationship is established, despite the external-tooth gears 305a and 305b according to this embodiment are non-symmetrically formed with various large and small holes as shown in FIG. 5, these are moved apart (parallel movement) in the maximum eccentric direction (180°) to be assembled. This means that the external teeth of the external-tooth gears 305a and 305b and various holes can be cut at one time (by one setting).

According to the conventional idea, that is, the idea "said external teeth cut at the same position are simultaneously meshed with the outer pins", the external-tooth gears have to be inevitably rotated by 180° and then assembled. In this case, in the case where various holes are cut simultaneously with the external teeth, when the gears are rotated by 180° and assembled, the phase of the holes become totally disordered, thus making it impossible to perform simultaneous cutting of the external teeth and holes after all.

That is, as far as the conventional idea is considered, the external teeth and various holes should be cut by separate setting, which increases the number of processing steps and tends to disorder the positional relationship between the external teeth and various holes, resulting in a great cause of lowering the accuracy when they are assembled.

In this embodiment, since two external-tooth gears 305a and 305b including the external teeth and various holes can be all simultaneously cut (by one setting), the accuracy of the positional relationship between the external teeth and various holes is remarkably enhanced, and the accuracy after completion can be enhanced.

It is further understood by those skilled in the art that the foregoing description is a preferred embodiment of the disclosed device and that various changes and modifications may be made in the invention without departing from the spirit and scope thereof.

What is claimed is:

1. An inscribed meshing planetary gear construction comprising a first shaft, a plurality of external-tooth gears mounted so that said external-tooth gears can be rotated eccentric around said first shaft through eccentric bodies provided on said first shaft, internal-tooth gear with which said external-tooth gears are inscribed and meshed, and a second shaft connected to said external-tooth gears through means for transmitting only the rotation component of the external-tooth gears, characterized in that a number of teeth of each of said external-tooth gears is set to integer times of the number of the external-tooth gears, a difference in the number of teeth between said internal-tooth gear and said external-tooth gear is set to integer times of the number of the external-tooth gears, said plurality of external-tooth gears are simultaneously cut in a state where they are superimposed, and said external-tooth gears are assembled in such a manner that they are moved in parallel in the maximum eccentric direction so that a external tooth of one of the external-tooth gears and a external tooth of the other external-tooth gear(s), which had been cut at same position during manufacturing respectively, are not simultaneously meshed with said internal-tooth gear during operation.

2. The construction according to claim 1, wherein the number of said external-tooth gears is set to 2, the difference in the number of teeth between said internal-tooth gear and said external-tooth gear is set to 2, and said two external-tooth gears are assembled to be apart from each other without rotating as they are in the maximum eccentric direction whereby said external teeth cut at the same position of said external-tooth gears are not simultaneously meshed with the internal-tooth gear.

3. An inscribed meshing planetary gear construction comprising an original shaft connected to an external member, a plurality of first shafts which rotate in response to a rotation of said original shaft, a plurality of external-tooth gears mounted in a state where they can be rotated eccentric around said original shaft through eccentric bodies provided on said plurality of first shafts, internal-tooth gear with which said external-tooth gears are inscribed and meshed, and a second shaft connected to the external-tooth gears through means for transmitting only the rotation component of said external-tooth gears, characterized in that
- a number of teeth of each of said external-tooth gears is set to integer times of the number of the external-tooth gears,
- a difference in the number of teeth between said internal-tooth gear and said external-tooth gear is set to integer times of the number of the external-tooth gears,
- said plurality of external-tooth gears are simultaneously cut in a state where they are superimposed, and
- said external-tooth gears are assembled in such a manner that they are moved in parallel in the maximum eccentric direction so that a external tooth of one of the external-tooth gears and a external tooth of the other external-tooth gear(s), which had been cut at same position during manufacturing respectively, are not simultaneously meshed with said internal-tooth gear during operation.

4. The construction according to claim 3, wherein the number of said first shafts is set to 3, the number of said external-tooth gears is set to 2, and the difference in the number of teeth between said internal-tooth gear and said external-tooth gear is set to 2,
- said two external-tooth gears are assembled to be apart from each other without rotating as they are in the maximum eccentric direction whereby said external teeth cut at the same position of said external tooth gears are not simultaneously meshed with the internal-tooth gear.

* * * * *